Figure 1:
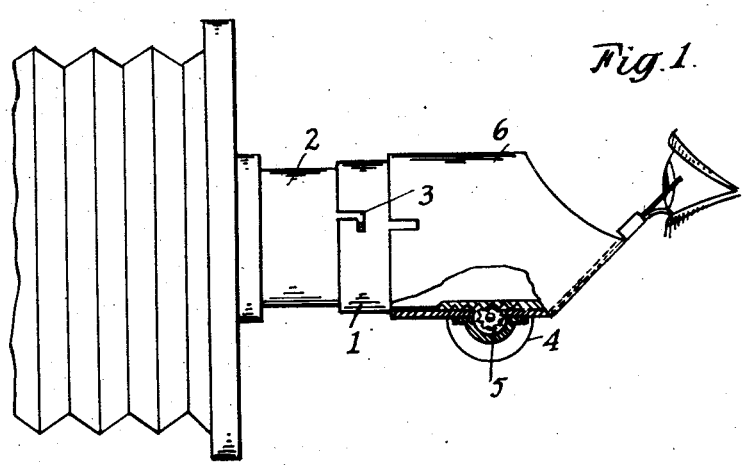

April 14, 1942.   G. NISSEL   2,279,795
FITTING OF CONTACT LENSES
Filed Dec. 7, 1939   2 Sheets-Sheet 1

Inventor:
George Nissel
By Chatwin Company
Attys.

April 14, 1942. G. NISSEL 2,279,795
FITTING OF CONTACT LENSES
Filed Dec. 7, 1939 2 Sheets-Sheet 2

Inventor:-
George Nissel
By Chatwin Company
Attys

Patented Apr. 14, 1942

2,279,795

UNITED STATES PATENT OFFICE 2,279,795

FITTING OF CONTACT LENSES

George Nissel, London, England

Application December 7, 1939, Serial No. 308,028
In Great Britain December 2, 1938

3 Claims. (Cl. 88—54.5)

This invention is concerned with contact eyeglasses, hereinafter referred to as contact lenses, and has for its object the provision of an improved method of, and apparatus for, fitting same.

There are three well known types of contact lenses and three different methods of fitting them.

In the case of the first type, the spherical or ground lenses have a round shape and a spherical scleral portion, with various corneal and scleral radii, and have to be tried on one by one before a contact lens can be chosen with a scleral portion which approximately fits the eyeball. These spherical lenses, although optically perfect, can be worn only for a limited time, because of the discomfort experienced by persons with a roundish eyeball, and those with an astigmatic eyeball cannot wear this type at all.

Secondly, in the case of the blown type contact lens, which is more of an artistic than an industrial product, the contact lens is made simply by guessing both the shape of the scleral part and the required optical power of the lens. The blown contact lens is made to fit the scleral part better than the spherical type of contact lens, but as the necessary correction cannot be blown with accuracy, the blown type of contact lens is not satisfactory.

Thirdly in the case of the moulded or pressed type of contact lens made entirely of glass, or entirely of synthetic resin, or with a glass corneal portion and with a synthetic resin scleral rim, the contact lens is usually made from the cast of the patient's eye. This is called the individually fitted contact lens and must be tried on several times with the eye anaesthetized and has to be altered to correspond in shape and size to the patient's eyeball. The cast taken with a plastic is, however, rarely perfect because it may break or alter in shape when removed from the eye so that it is no longer correct. Further it is not possible to take a cast of the whole surface of the eyeball on which the contact lens is supposed to rest in actual use.

A well fitting contact lens can be comfortably worn from 8 to 14 hours a day. Such a contact lens must fulfill the following requirements:

1. It must have a balanced fit on the scleral part of the eye, without a suction effect.

2. It must not put any pressure on the limbus periphery, that is an area of 1½ to 2½ mm. around the corneal which is 11 to 12 mm. in diameter. The limbus region on the inside of the contact lens must be worked very smooth so that there are no ridges or edges in the transitional portion between the corneal part and the scleral part of the contact lens.

3. At the middle of the cornea it must have an excess pressure of 0.05 mm. so as to prevent the formation of a water lens between the eye and the inside of the lens, which would alter the optical correction of the contact lens. Thus by grinding away 0.05 mm. from the inside of such a lens, it will just stand away from the top of the cornea.

4. The corneal curvature on the inside of the lens must be correctly chosen. Generally this portion should be about 0.3 to 0.5 mm. shallower than the patient's corneal curvature. This will prevent the formation of an air bubble around the cornea which is very irritating, and will cause a capillary circulation of the saline beneath the contact lens.

5. The edge of the contact lens must not show except when the patient is looking to the extreme right or left, but must not reach the conjunctiva.

6. The contact lens must have the correct optical (refractive) correction. Spheric lenses must be used for normal astigmatic or irregular astigmatic eyes and cylindrical lenses for lenticular astigmatic eyes.

When all these conditions are fulfilled, the contact lens moves with the eye wheresoever the patient will look and he will look always through the centre part that is through 5 to 6 mm. of the total diameter of 10.5 to 12 mm. of the lens. Although there are many hundreds of individually fitted contact lenses already in use, this casting and fitting operation hitherto had to be made for each case all over again. The fitting has been effected by grinding the inside of a trial contact lens or by altering the plaster or metal mould until the final shape is reached. This needs a long surgical study of the patient's eye by an ophthalmic surgeon capable of handling grindstones, and plaster and metal moulds.

By the present invention it is intended to cut down the time hitherto required for fitting contact lenses and to permit surgeons with any general knowledge of contact lenses and not resident near the place of manufacture of the contact lenses to provide his patients with individually fitted contact lenses.

According to the invention, the method includes the steps of taking photographs of at least two meridians of the eyeball and with the eyeball in its extreme positions in such meridians, comparing such photographs with photographs of positive casts of previously individually fitted contact lenses, selecting the positive cast which corresponds in shape most closely to the eyeball, and preparing the contact lens from such positive cast the photographs being taken radially through the pupil.

The nature of the invention will be further understood from the following detailed description which refers to the accompanying drawings, wherein—

Figure 2:
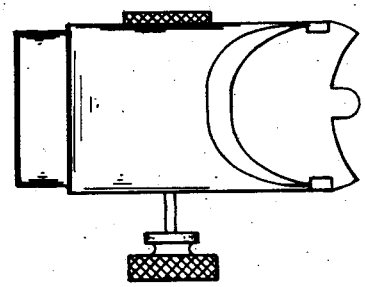
Figure 3:
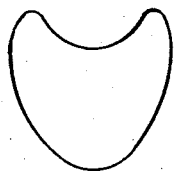
Figure 4:
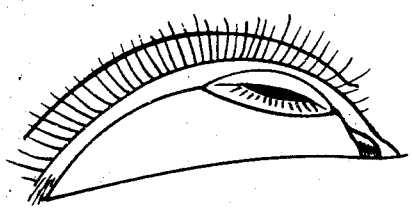
Figure 5:
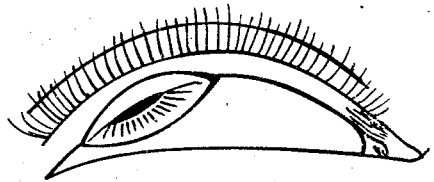

Figure 1 shows, in a fragmentary sectional side elevation, fitted on a camera lens mount, an attachment employed for taking photographs of the horizontal meridian of the patient's eye; Fig. 2 shows this attachment alone in plan; and Fig. 3 shows a form of mirror to be used in conjunction with the attachment; Figs. 4 to 7 show four positions of the eyeball when photographs are being taken as hereinafter described; Fig. 8 shows the horizontal full length profile or meridian of an eyeball obtained by superimposing Figures 1 and 2; Fig. 9 shows a vertical view similar to Fig. 8 obtained by superimposing Figs. 3 and 4; Fig. 10 illustrates the appearance of a photographed meridian showing the profile of the eye.

Referring to the drawings, the attachment consists of an inner tube 1 detachably mounted on the lens mount 2 of a camera suitable for taking close pictures, such as a triple extension camera, by means of a bayonet joint 3.

The camera employed has a fixed focal length so as to ensure that all the pictures taken by it are of uniform magnification. The focussing is thus simply effected by moving the camera with the attachment thereon up to the eyeball. The inner tube 1 has a rack portion 4 for engagement with a pinion 5 mounted on an outer tube 6 adapted to slide telescopically over said inner tube. The pinion 5 further carries a spindle 7 adapted to be rotated, for the purpose of fine adjustment, by turning knurled wheels 8.

The forward end of the outer tube 6 is cut away on its upper side as at 9 and has its lower side formed with a support 10 inclined at 45° to the horizontal. This support 10 is recessed at its forward extremity and there formed with a downwardly bent lip 11 adapted to rest on the lower lid 12 of the patient's eye. The support is further formed at its sides with two lips 13 which are bent over and adapted to hold in place on the support a mirror 15 of the form shown in Fig. 3.

This mirror 15 which is somewhat elliptical in shape has a recess 14 adapted in shape to the curvature of the patient's eye so that, when mounted on the support 10, it may be moved very closely up to the patient's eyeball. Several such mirrors 15 with differently curved recesses 14 are provided to permit a close view of any particularly shaped eye to be taken.

It will now be readily seen that, with the mirror brought closely up to the patient's eyeball, a photograph of the curvature of the horizontal meridian may be taken. To obtain a whole length curve of the meridian a first photograph will be taken with the patient looking to the extreme left showing the right portion of his eyeball and the cornea in the extreme corner of the picture, and a second photograph will be taken with the patient looking to the extreme right, leaving his left scleral portion visible, and with the cornea in the opposite corner.

By copying such two photographs together so that the corneae, which appear in both of them, will be exactly superimposed, a whole length curve of the horizontal meridian from one end to the other end of the conjunctiva will be obtained.

The vertical profile that is the curvature of the vertical meridian of the eye will be taken in a similar manner, either by directly photographing the eye or by obtaining a projection thereof onto a screen by application of a small source of light to a spot near the inner corner of the eye. Firstly, a photograph will be taken with the patient looking upwards and showing the bottom part of his eyeball and the cornea next to the upper eyelid. A second photograph is then taken with the patient looking downwards while holding his upper eyelid in the position in which the previous photograph was taken. These two photographs are copied again with the corneae, which appear again in both pictures, superimposed.

All the other profiles in different meridians can be obtained in a similar way. In the case of a very deep set eye it is inevitable to pull apart the eyelids, but this can be done carefully without affecting the conjunctiva.

To ensure that the two sets of photographs are taken with the patient's eye exactly in the correct meridian, in the case of the horizontal meridian a long horizontal line is provided some distance from the rear of the camera at the extremities of which the patient must keep on looking in turn whilst the two photographs are being taken. Similarly, in the case of the second set of photographs, the patient must look, in turn, to the upper and lower ends of a perpendicular line also disposed in front of him.

It will generally be found sufficient to take two photographs only about the horizontal and vertical meridians of the eye, as has been described hereinabove. However, in the case of a very irregular astigmatic any number of views can be taken to present accurate definition of the shape of the eyeball. There is no difficulty to take additional views and such views are preferably taken about meridians inclined at 15° to one another.

The photographs taken of the patient's eye are compared with similar photographs of equal magnitude of positive casts taken from previously fitted patients. For this purpose the types, as the positive casts are hereinafter referred to, have each their individual photographic chart and they are classified in groups as to the type of the patient's eye. In this way all keratoconus, myopic, hypermetropic, aphacic, gassed and other cases are kept separate and each of such groups can again be further classified according to shape, size and curvature.

The comparison of the photographs of the patient's eye and the chart attached to the types may be facilitated by having the curves on the charts reinforced by black dotted lines and those on the photographs of the patient's eye inked over in white. Thus by lighting through the two sets of superimposed photographs it can be seen without difficulty whether they correspond.

It will be understood that, if both the photographs taken of the patient's eye and the types are enlarged to the same extent, small details can be observed more readily.

Thus, when a type has been found, which corresponds to the patient's eye, no fitting has to be done. In any case it is only necessary to select two of the types which correspond most closely to the patient's eye and have contact lenses prepared from them to be tried on by the patient. No optical correction is necessary. If one of these trial glasses is worn with comfort by the patient, it will be made to a final contact lens. If the trial glasses do not fit exactly, they will be altered to the surgeon's requirements.

Having made several thousand contact lenses, my experience shows that 60 to 70% of all cases, although hitherto individually fitted, are practically of the same shape and of standard size. Thus, having a stock of 200 to 240 pairs of selected types, 60% of all patients can be supplied with contact lenses with a perfect result and without any additional fitting. 20% of the remainder can be made to fit with small alterations and the rest of the cases, such as cases of keratoglobus and very irregular astigmatic receive special attention.

Figure 6:
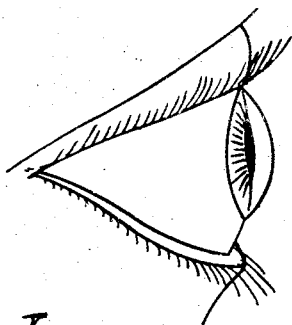
Figure 7:
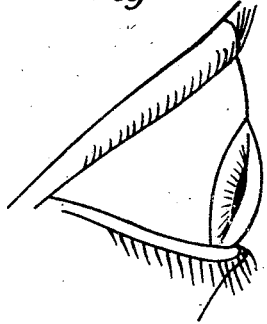
Figure 8:
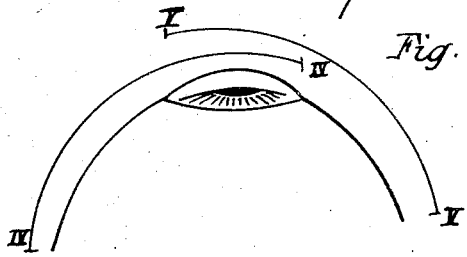
Figure 9:
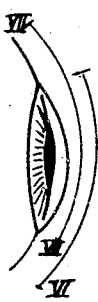
Figure 10:
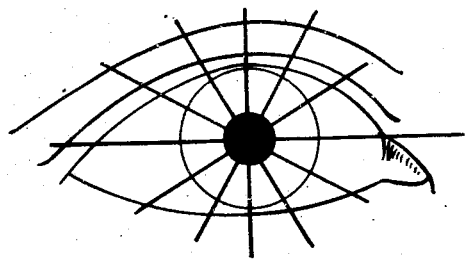

In Fig. 8, the indications I—I and II—II show the parts corresponding respectively to Figs. 1 and 2 and similarly in Fig. 9 the indications III—III and IV—IV show the parts corresponding to Figs. 6 and 7; the common area (where the indications overlap) is naturally the cornea and it will be clearly seen that the points which facilitate the superimposition, are on the corneal curvature where it joins the sclera.

It is, of course, understood that the present invention is not limited to the foregoing description. Many modifications may occur to those skilled in the art. For instance, it may be found desirable to take cinematographic pictures of the eyeball and the types. It is intended to cover such and other modifications that fall within the appended claims.

I claim:

1. The method of manufacturing a contact lens consisting in the steps of taking photographs of at least two meridians at right angles to each other, of the profile of the eye-ball and with the eyeball in its extreme and opposite positions in such meridians, such photographs being taken radially through the pupil, copying the photographs of each meridian together with a common area superimposed, comparing such photographs with photographs of positive casts of previous individually fitted contact lenses, selecting the positive cast which corresponds in shape most closely to the eyeball and preparing the contact lens from such positive cast.

2. The method specified in claim 1 wherein photographs of the horizontal and vertical meridians of the eyeball are taken through the pupil.

3. The method specified in claim 1 wherein the vertical profile of the eyeball is projected onto a screen to be photographed.

GEORGE NISSEL.